(12) United States Patent
Gurin

(10) Patent No.: US 7,950,243 B2
(45) Date of Patent: May 31, 2011

(54) CARBON DIOXIDE AS FUEL FOR POWER GENERATION AND SEQUESTRATION SYSTEM

(76) Inventor: Michael H. Gurin, Glenview, IL (US)

( * ) Notice: Subject to any disclaimer, the term of this patent is extended or adjusted under 35 U.S.C. 154(b) by 836 days.

(21) Appl. No.: 11/927,675

(22) Filed: Oct. 30, 2007

(65) Prior Publication Data

US 2009/0139234 A1 Jun. 4, 2009

Related U.S. Application Data

(63) Continuation-in-part of application No. 11/306,911, filed on Jan. 16, 2006, now Pat. No. 7,313,926, and a continuation-in-part of application No. 11/691,070, filed on Mar. 26, 2007, now abandoned.

(51) Int. Cl.
*F25B 27/00* (2006.01)

(52) U.S. Cl. .......... 62/238.3; 62/238.7; 62/476

(58) Field of Classification Search .......... 62/101, 62/235.1, 323.2, 323.3, 324.2, 238.7, 476; 60/645

See application file for complete search history.

(56) References Cited

U.S. PATENT DOCUMENTS

| | | | | | |
|---|---|---|---|---|---|
| 3,095,274 | A | * | 6/1963 | Crawford | 423/649 |
| 4,152,901 | A | * | 5/1979 | Munters | 62/112 |
| 5,050,375 | A | * | 9/1991 | Dickinson | 60/39.12 |
| 5,360,057 | A | * | 11/1994 | Rockenfeller et al. | 165/104.12 |
| 5,943,869 | A | * | 8/1999 | Cheng et al. | 62/121 |

* cited by examiner

*Primary Examiner* — Melvin Jones

(57) ABSTRACT

An integrated energy production system and carbon dioxide reaction system for enhancing the energy efficiency and minimizing greenhouse gas emissions of thermally activated power production methods. The system utilizes heat of reaction from the carbon dioxide reaction system to directly reduce the fuel requirements of the thermally activated power production method. The system, when utilizing a reverse fuel cell, achieves concurrent carbon dioxide sequestration resulting from the fuel combustion.

51 Claims, 5 Drawing Sheets

CARBON DIOXIDE AS FUEL FOR POWER GENERATION AND SEQUESTRATION SYSTEM

CROSS-REFERENCE TO RELATED APPLICATIONS

This application claims priority to U.S. patent application Ser. No. 11/691,070, filed on Mar. 26, 2007, for "Biomass Fuel Synthesis Methods for Increased Energy Efficiency", which is incorporated herein by reference in its entirety.

FIELD OF THE INVENTION

Exothermic carbon dioxide reactions as an integral and thermally connected energy source of thermally activated power generators, and combustion power generators are provided.

BACKGROUND

Various embodiments relate to operable modes for generating power to optimize the energy efficiency and minimize emissions associated with the power generation process by utilizing the exothermic energy created by carbon dioxide consuming reactions. It would be beneficial to shift the focus of carbon dioxide sequestration from a net energy consumer to a net energy producer.

The term "thermodynamic power generating cycle" refers to the non-wired measures to establish communications. This includes, but is not limited to, infrared, radio frequency, cellular, radar, and power-line carrier.

The term "exothermic reaction" is a reaction that releases heat, and is the opposite of an endothermic reaction. In an exothermic reaction, the total energy absorbed in bond breaking is less than the total energy released in bond making. In other words, the energy needed for the reaction to occur is less than the total energy provided. As a result of this, the extra energy is released, usually in the form of heat.

The term "endothermic reaction" describes a process or reaction that absorbs energy in the form of heat.

The term "sequester" is describing processes that remove carbon dioxide from the atmosphere.

The term "carbonate" is a salt or ester of carbonic acid. The term "carbonate" is also commonly used to refer to one of these salts or carbonate minerals. Most common is calcite, or calcium carbonate, the chief constituent of limestone.

The term "polycarbonates" are polymers having functional groups linked together by carbonate groups (—O—(C=O)—O—) in a long molecular chain.

The term "heat of solution" of a substance is defined as the difference between the energy absorbed, or endothermic energy, and energy released, or exothermic energy (expressed in "negative" kJ/mol). Negative heat of solutions tend to form stronger bonds and have lower vapor pressure.

The term "biofuel" is defined as solid, liquid, or gas fuel consisting of, or derived from biomass. The definition used here is narrower: biofuel is defined as liquid or gas transportation fuel derived from biomass.

The term "ionic liquids" "ILs" is defined as liquids that are highly solvating, non-coordinating medium in which a variety of organic and inorganic solutes are able to dissolve. They are effective solvents for a variety of compounds, and their lack of a measurable vapour pressure makes them a desirable substitute for Volatile Organic Compounds (VOCs). Ionic liquids are attractive solvents as they are non-volatile, non-flammable, have a high thermal stability, and are relatively inexpensive to manufacture. The key point about ionic liquids is that they are liquid salts, which means they consist of a salt that exists in the liquid phase and have to be manufactured; they are not simply salts dissolved in liquid. Usually one or both of the ions is particularly large and the cation has a low degree of symmetry. These factors result in ionic liquids having a reduced lattice energy and hence lower melting points.

The term "supercritical" is defined as the point at which fluids have been exploited above their critical temperatures and pressures.

The term "stoichiometric excess" is used herein to mean that the total moles of carbon dioxide "CO2" present exceeds the total moles of CO2 consumed in the reaction. In other words, the term "stoichiomeric excess" refers to an amount of CO2 that exceeds stoichiometry by about 5% to about 800%. Stoichiometry rests upon the law of conservation of mass, the law of definite proportions (i.e., the law of constant composition) and the law of multiple proportions. In general, chemical reactions combine in definite ratios of chemicals. Since chemical reactions can neither create nor destroy matter, nor transmute one element into another, the amount of each element must be the same throughout the overall reaction. For example, the amount of element X on the reactant side must equal the amount of element X on the product side.

The term "stoichiometric equivalent" is used herein to mean that the total moles of carbon dioxide "CO2" present is equal to the total moles of CO2 consumed in the reaction.

The term "process intensification" is defined as the miniaturization of chambers in which chemical mixing or reactions take place. The utilization of micromixing, particularly with supercritical fluids, achieves high mass transfer and fast reaction times The term "microchannel" refers to channel dimensions less than 1 millimeter, and is generally used in the context of heat exchangers having channels of less than 1 millimeter.

The term "syngas" is the name given to a gas mixture that contains varying amounts of carbon monoxide and hydrogen generated by the gasification of a carbon containing fuel to a gaseous product with a heating value. Syngas consists primarily of carbon monoxide, carbon dioxide and hydrogen, and has less than half the energy density of natural gas. Syngas is combustible and often used as a fuel source or as an intermediate for the production of other chemicals.

The term "fuel cell" is an electrochemical energy conversion device. It produces electricity from external supplies of fuel (on the anode side) and oxidant (on the cathode side). These react in the presence of an electrolyte.

The term "reverse fuel cell" is an electrochemical energy conversion device that consumes electricity from an external source to electrochemically reduce a series of reactants, in other words it is the opposite of a fuel cell.

The term "pyrolyzer" is a device that heats a substance to make it decompose a complex chemical substance into simpler substances.

The term "gasifier" is a device that achieves gasification, which is a process that converts carbonaceous materials, such as coal, petroleum, or biomass, into carbon monoxide and hydrogen by reacting the raw material at high temperatures with a controlled amount of oxygen. The resulting gas mixture is called synthesis gas or syngas and is itself a fuel.

The term "porous burner" is a burner filled with a ceramic foam or other high-temperature resistant structure Various embodiments provide a new and high efficiency means of generating power with reduced fuel requirements while concurrently sequestering carbon dioxide and methods of use.

Additional features and advantages of the various embodiments are described herein and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

SUMMARY

A high efficiency, environmentally friendly power generation process is provided. The process uses the combination of a primary energy generator with integral carbon dioxide exothermic reaction to increase the overall efficiency. The further incorporation of a reverse fuel cell increases the value of the energy product, especially by the production of liquid fuels by reducing carbon dioxide.

DETAILED DESCRIPTION OF THE PREFERRED EMBODIMENTS

The figures depict many connection points to indicate connecting points between the many individual figures. Some of these connecting points have specific representation including "Q" that is symbolic for heat, "P" that is symbolic for power, and "RC" that is symbolic for reaction coproducts. The remaining connecting points are not symbolic, but again only represent connecting points between one figure to another figure. These include "J", "E", "G", "B", "H", "D", and "C".

One embodiment of an energy production system, hereinafter referred to as Carbon Neutral Fuel or "CNF" is comprised of a carbon dioxide reaction that utilizes the carbon dioxide reaction to create additional thermal energy (thus is a thermal source) within a thermodynamic power generating cycle. The carbon dioxide reaction reduces the fuel requirement of the thermodynamic power generating cycle by utilizing the exothermic energy resulting from the reaction to displace at least 5% of the otherwise fuel input required.

Figure 1:
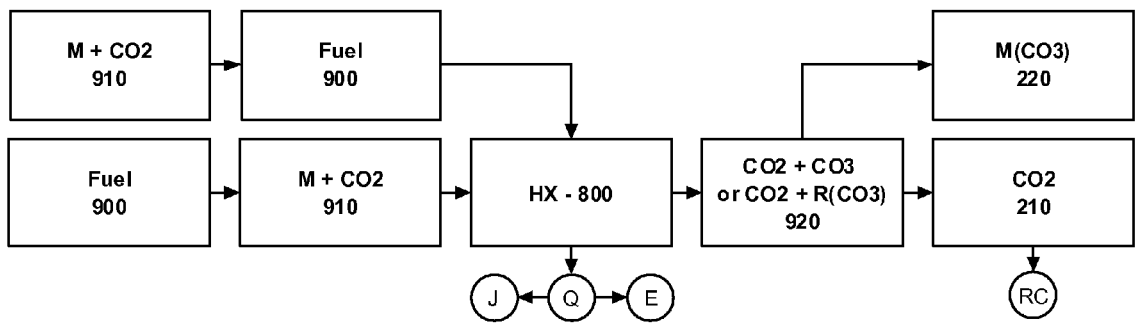
FIG. 1 is a schematic diagram depicting an exothermic carbon dioxide reaction with an additional fuel as a thermal input.

Referring to FIG. 1, a series of carbon dioxide reactions are depicted with the carbon dioxide reaction producing both reaction byproducts and thermal energy. The combination of minerals "M", recognized in the art as creating carbonates when reacting with carbon dioxide, are reacted with carbon dioxide "CO2". The carbon dioxide reaction, which is the combined M+CO2 910, can take place either before or after the combustion of fuel reaction 900 with the result being thermal energy that is transferred to another process via the heat exchanger 800. The carbon dioxide reaction produces reaction products 920, which includes carbon dioxide, carbonates, and polycarbonates. The minerals specifically yield mineral carbonates 220 which are isolated from any un-reacted carbon dioxide 210. The un-reacted carbon dioxide 210 is attributed to either incomplete reaction or the utilization of a stoichiometric excess of carbon dioxide "RC" and is further used in additional processes shown in subsequent figures. Thermal energy "Q" created by the carbonation of the minerals is depicted by "J" and additional thermal energy created by the combustion of the fuel is depicted by "E", which is then transferred to additional processes shown in subsequent figures.

Yet another CNF embodiment is further comprised of at least one microchannel device, which can be depicted as the heat exchanger 800 in FIG. 1, wherein the microchannel device has channels less than 10 microns and wherein the microchannel device is upstream of the mixing of carbon dioxide and the carbon dioxide co-reactant. The microchannel device, without being bound by theory, reduces the particle size of the reaction products by limiting particle agglomeration. It is known in the art that nanoscale particles have many advantages over their non-nanoscale counterparts, thus CNF has the further advantage of increasing the value of the resulting products. Preferred reaction product particles have a particle size diameter of less than 10 microns. Particularly preferred particle sizes are less than 1 micron, and specifically preferred particle sizes are less than 100 nanometers. It is also known in the art that superior properties of nanoscale materials often occur at even smaller sizes, by way of example particles less than 50 nanometers are superior to 100 nanometers particles in absorbing CO2 when utilized as an absorbent.

CNF concurrently increases the energy efficiency of the thermodynamic power generating cycle while sequestering the carbon dioxide "fuel" yielding at least a 5% reduction in resultant carbon dioxide produced per unit of energy produced as compared to a thermodynamic power generating cycle without the addition of the aforementioned carbon dioxide reaction. It is known in the art of CO2 reaction chemistry that CO2 reactions include reactions yielding the creation of carbonates and notably polycarbonates. CNF CO2 reactions result in a range of co-products anticipated thus further increasing the revenue for the thermodynamic power generating cycle plus the further ability to recover carbon trade credits through both the reduction of CO2 produced in the power generating cycle and the sequestering of CO2 via the CO2 exothermic reaction. The CO2 exothermic reaction is considered a "low" temperature reaction as compared to traditional fuels utilized in a combustion driven thermodynamic power generating cycles. A low temperature reaction is characterized as a reaction taking place at temperatures derived from the thermodynamic power generating cycle such that the reaction takes place at a starting temperature of less than 400 Fahrenheit "F". The preferred temperature is less than 250 F and the particularly preferred temperature is the lesser of 100 F or ambient temperature. CNF can be configured such that the carbon dioxide reaction can precede or follow at least one thermal reaction. And the carbon dioxide reaction can either increase the enthalpy (i.e., increase the quality of heat) prior to the thermodynamic power generating cycle (i.e., before the expansion device) or post the expansion device to increase the quality of heat discharged (i.e., bottom cycle) from the thermodynamic power generating cycle. Recovery of the heat discharged can then be transformed into additional mechanical or electrical energy by either a second expansion stage within the thermodynamic power generating cycle or a second thermodynamic power generating cycle that at least in part is driven by the thermal energy of the exothermic carbon dioxide reaction. The latter scenario recovers the bottom cycle thermal energy by utilizing a condensing device having a working fluid with a discharge temperature. The carbon dioxide reaction therefore has a starting temperature of approximately the discharge temperature and depending on the configuration (i.e., whether the carbon dioxide reaction is in fluid communication with the working fluid of the first thermodynamic power generating cycle or the second thermodynamic power generating cycle.

Yet another embodiment is the utilization of waste heat, which is from the bottom cycle of the aforementioned thermodynamic power generating cycle, as the first stage of a thermal energy source that is subsequently upgraded to a higher enthalpy by the CO2 exothermic reaction. The CO2 exothermic reaction is characterized as a low temperature reaction such that the discharge temperature of the thermodynamic power generating cycle condenser is less than 400 Fahrenheit "F". The preferred temperature is less than 250 F and the particularly preferred temperature is the lesser of 100 F or ambient temperature. A particularly preferred condenser is a heat exchanger removing the heat of absorption from within an absorber from a binary fluid absorption heat pump. In other words, the combustion byproducts post expander is subsequently reheated to increase the heat quality for a second thermodynamic cycle.

Yet another embodiment of CNF is the further utilization of the cooling resulting from the aforementioned absorption heat pump to reduce the energy costs associated with sequestration of the CO2 produced from the thermodynamic power generating cycle. The preferred embodiment utilizes the absorption heat pump to produce cooling that increases the yield of absorbed/condensed CO2 (e.g., Alstom cycle) without being a parasitic energy loss otherwise required for traditional vapor compression refrigeration. CNF via the carbon dioxide reaction increases the enthalpy within the aforementioned thermodynamic power generating cycle (i.e., first thermodynamic cycle). As in any thermodynamic cycle, the first thermodynamic power generating cycle contributes thermal energy to drive the absorption heat pump. The preferred absorption heat pump working fluid is comprised of a carbon dioxide absorbent, and co-reactants for an endothermic chemical reaction wherein the process of absorbing carbon dioxide by the absorbent produces heat of absorption that is at least a partial source of thermal energy for a subsequent endothermic chemical reaction.

Figure 2:
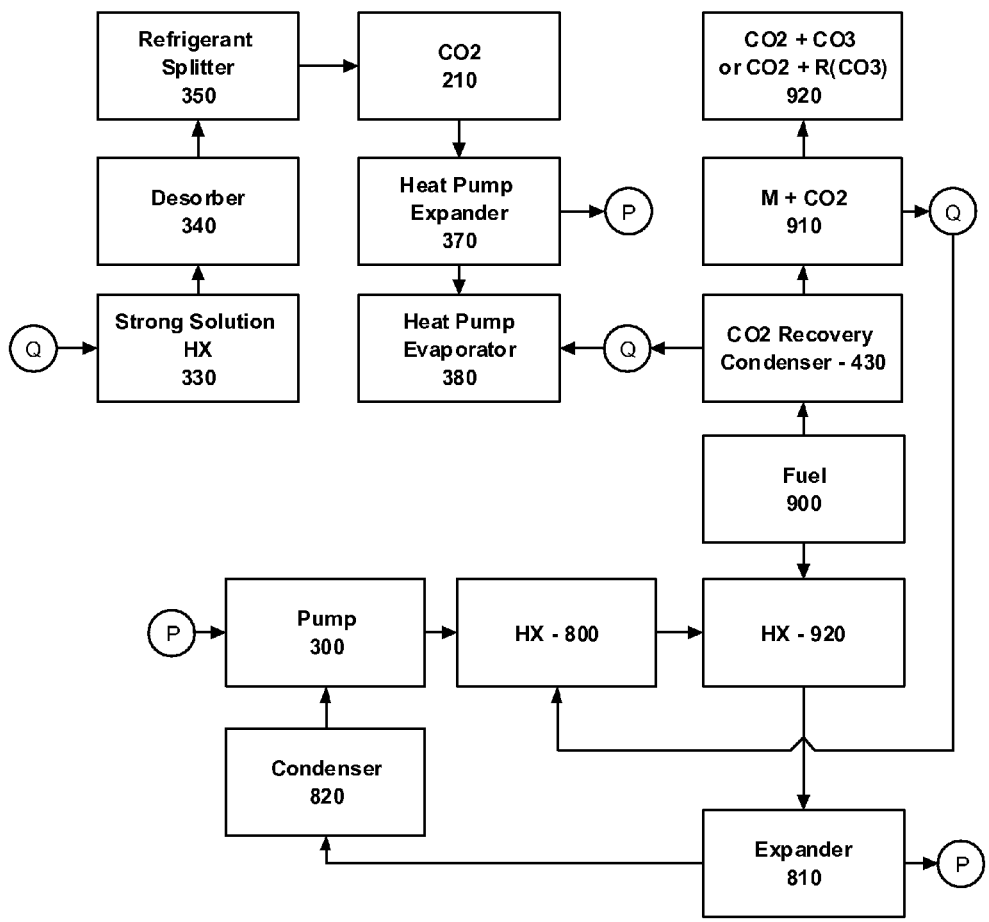
FIG. 2 is a schematic diagram depicting the integration of an exothermic carbon dioxide reaction with an absorption heat pump.

Referring to FIG. 2, the direct integration of an absorption heat pump with carbon dioxide sequestration reduces the total power requirements. Heat "Q" is transferred into the absorption heat pump desorber 340, which contains the strong solution, through the strong solution HX 330. The working fluid, with exemplary working fluid/refrigerant being CO2, is separated by means known in the art as indicated by refrigerant splitter 350. The refrigerant CO2 210 then passes through a heat pump expander 370 to generate power "P". Alternatively, the CO2 can simply pass through an expansion valve if only cooling is desired. The now expanded refrigerant provides cooling "Q" through the heat pump evaporator 380. This cooling "Q" is utilized, at least in part, to condense a second stream of CO2 resulting from the combustion of fuel 900 from a primary thermodynamic power generating cycle. The primary thermodynamic power generating cycle in its simplest form is represented by a pump 300 that increases the operating pressure of the primary thermodynamic power generating cycle working fluid. The working fluid is then heated to increase the enthalpy of the working fluid through at least one heat exchanger 800 to utilize the heat of reaction from the exothermic reaction of CO2 and minerals "M" 910 to result in the creation of carbonates, polycarbonates, or mineral carbonates specifically 920. A second heat exchanger 920 further increases the enthalpy of the working fluid by utilizing the heat of combustion from the fuel 900 (the combustion of any carbon containing fuel results in the creation of additional CO2) prior to the expansion stage through an expander 810 to generate additional power "P". The now expanded working fluid of the primary thermodynamic cycle is now condensed to a liquid (or a lower pressure supercritical fluid) through a condenser 820 prior to starting the cycle all over again into the pump 300.

Figure 3:
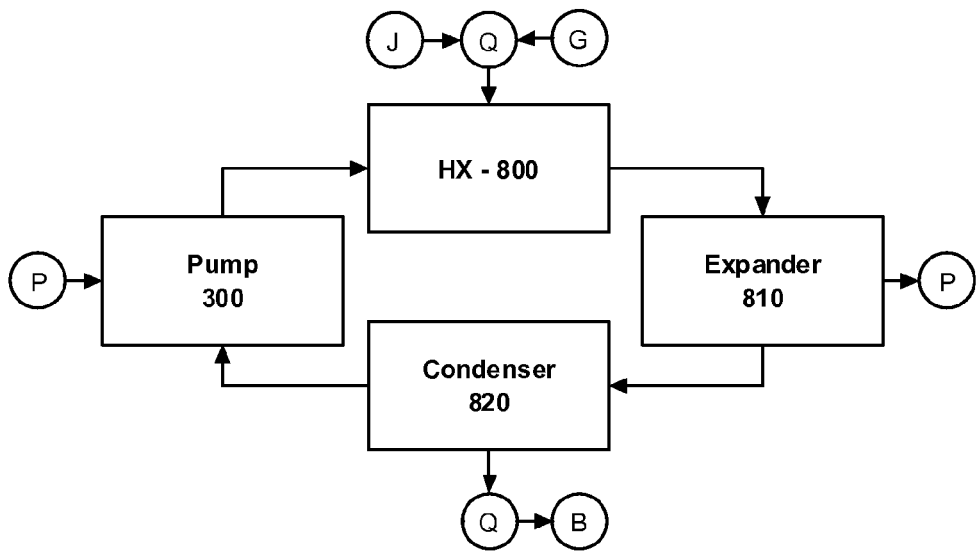
FIG. 3 is a schematic diagram depicting the integration of an exothermic carbon dioxide reaction into a primary thermodynamic power generating cycle.

Referring to FIG. 3, the primary thermodynamic cycle (same as in FIG. 2 for description of pump 300, heat exchanger 800, expander 810, and condenser 820) is depicted with additional thermal inputs and outputs. The thermal energy removed from the working fluid to return the fluid into a liquid is depicted by "B" and is utilized in at least one method including thermal energy for a subsequent endothermic reaction, thermal energy to accelerate an electrochemical reaction such as in an electrochemical reverse fuel cell. Thermal energy utilized within the primary thermodynamic cycle to increase the enthalpy of the working fluid is depicted by either "J" with an exemplary being thermal energy from an exothermic carbonation reaction or "G" with an exemplary being thermal energy from heat of absorption.

Figure 4:
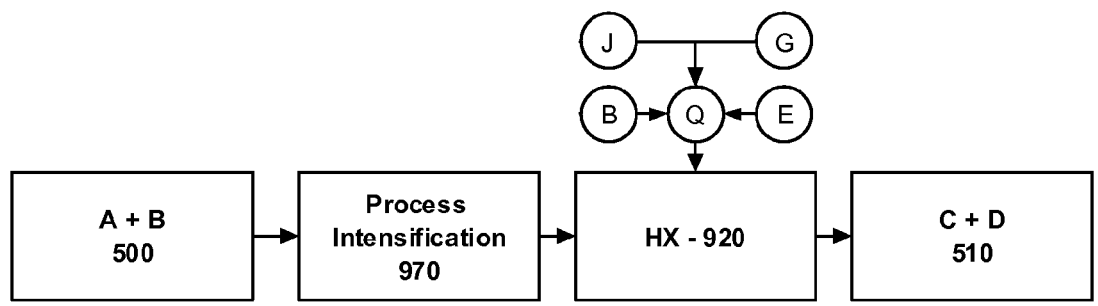
FIG. 4 is a schematic diagram depicting the integration of an exothermic carbon dioxide reaction with an endothermic reaction.

Referring to FIG. 4, an endothermic reaction takes place between at least two reaction components "A" and "B" 500 plus thermal energy "Q" yields at least two reaction coproducts "C" and "D" 510. The reaction is accelerated by the use of process intensification methods 970, as known in the art, to create intimate mixing of "A" and "B" 500. Thermal energy "Q", which can be obtained from sources including "B" being exemplary of thermodynamic power generating cycle condensing energy, "J" being exemplary of an exothermic chemical reaction, "G" being exemplary of heat of absorption, and/or "E" being exemplary of waste heat from combustion of fuel(s), accelerates the creation of coproducts "C" and "D" 510.

CNF's reaction rate, as in virtually any chemical reaction, is significantly impacted by the surface area of its' chemical co-reactants. Therefore, a preferred embodiment increases the surface area of at least one of the co-reactants by solubilizing (i.e. solubility agent) the co-reactant prior to the chemical reaction. The particularly preferred CNF solubilizes $CO_2$ (i.e., absorbate) within an absorbent that concurrently serves as the solubility agent during the carbon dioxide reaction. The absorbents ability to absorb $CO_2$ and concurrently solubilize at least one other co-reactant increases the reaction rate, which results in a higher power production throughput. Specifically preferred absorbents are selected from the group consisting of ionic liquids and poly(ionic liquids). The specifically preferred embodiment has the $CO_2$ in it's supercritical state (i.e., supercritical fluid) to further enhance the reaction rate and maximize reaction selectivity.

Figure 5:
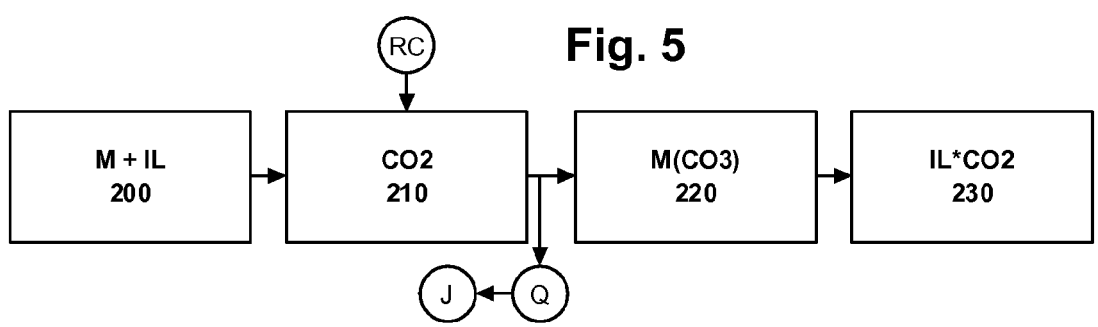
FIG. 5 is a schematic diagram depicting the integration of an exothermic carbon dioxide reaction utilizing a dual function ionic liquid solution.

Referring to FIG. 5, depicts the utilization of ionic liquids with a dual purpose being the dissolution of minerals "M" prior to carbonation and the subsequent absorption of carbon dioxide "$CO_2$". Minerals are added to ionic liquid 200 as method known in the art to solubilize, or at least to increase the surface area of the minerals. The mixture of minerals and ionic liquids are further mixed with $CO_2$ 210 (which can be $CO_2$ from fuel combustion processes "RC"). The mixing of $CO_2$ begins the exothermic reaction between the minerals and $CO_2$, in which thermal energy "Q" is removed through means known in the art (e.g., heat exchanger) as thermal energy output "J" and utilized as a thermal input in additional processes shown in both earlier and subsequent figures. The exothermic reaction creates mineral carbonates 220 and when a stochiometric excess of $CO_2$ is utilized, the excess $CO_2$ is absorbed in the ionic liquid 230. Benefits include the lower energy costs associated with pumping $CO_2$ to a higher pressure (i.e., supercritical) as compared to compressing the $CO_2$ to the same higher pressure. The now absorbed $CO_2$ can be thermally desorbed to isolate the $CO_2$ for non-carbonation $CO_2$ sequestration methods.

Figure 6:
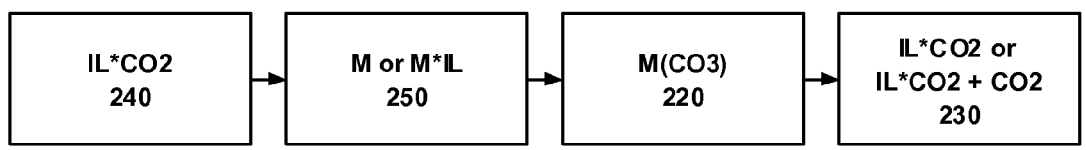
FIG. 6 is a schematic diagram depicting another exemplary of the integration of an exothermic carbon dioxide reaction utilizing a dual function ionic liquid solution.

Referring to FIG. 6, depicts another embodiment of dual purpose ionic liquids. An ionic liquid having absorbed $CO_2$ 240 is mixed with a mineral "M" for carbonation or a mineral solubilized in an ionic liquid "M*IL" 250. The exothermic reaction creates mineral carbonates 220 and when a stochiometric excess of $CO_2$ is utilized, the excess $CO_2$ is absorbed in the ionic liquid 230. When a stochiometric excess of $CO_2$ is utilized beyond the $CO_2$ absorption rate of the ionic liquid at the specified pressure and temperature, free $CO_2$ may remain as compared to absorbed $CO_2$ "IL*$CO_2$".

Figure 7:
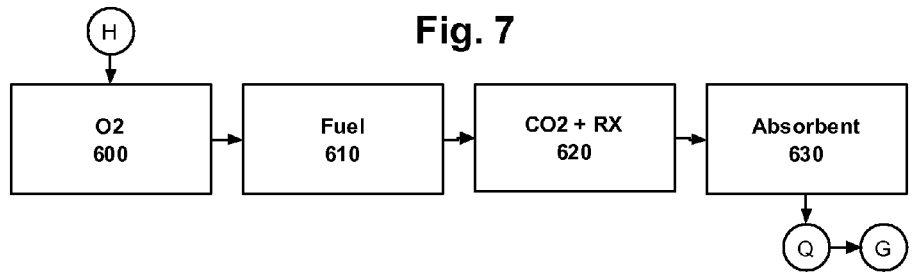
FIG. 7 is a schematic diagram depicting the absorption of carbon dioxide to produce heat that is integrated into a power generating cycle.

Referring to FIG. 7, depicts another embodiment that utilizes oxygen "$O_2$" 600 and transfers thermal energy "Q" from $CO_2$ absorption "G" for increased energy efficiency of carbon dioxide sequestration. It is known in the art that utilizing a pure (or relatively pure) stream of oxygen 600 for fuel 610 combustion produces a pure (or higher concentration) stream of $CO_2$ 620. The capturing of resulting $CO_2$ into an absorbent 630 creates heat of absorption "G", which as shown in earlier and subsequent figures, that is best utilized as a thermal source in a relatively low temperature thermodynamic power generating cycle to create additional power.

CNF creates reaction byproducts that are solid (i.e., mineral carbonates, polymer carbonates) or liquid reaction products. The reaction products have the potential to damage any downstream device, including an expansion device that is utilized to convert the high pressure and high temperature working fluid (i.e. the stoichiometric excess of $CO_2$) into either mechanical and/or electrical energy by methods known in the art. The preferred thermodynamic power generating cycle utilizes an expansion device designed to handle at least 5% on a volume basis the carbon dioxide reaction products. The preferred expansion device is a positive displacement pump including a gerotor and a vane pump. Traditional high rotation per minute "RPM" devices such as a turbine are more susceptible to damage created by the solid or liquid particles. The further inclusion of an upstream filtration device enables the removal of the reaction products from the carbon dioxide reaction, with a particular preferred filtration device having the ability to remove particles having a molecular weight greater than 200 grams/mol from the working fluid (i.e., stoichiometric excess $CO_2$). Specifically preferred filtration devices capture reaction products having a molecular weight greater than 100 grams/mol, or reaction product agglomerates larger than 10 microns. The utilization of nanofiltration devices, as known in the art, readily remove particles having a size greater than 2 microns from the working fluid.

Figure 8:
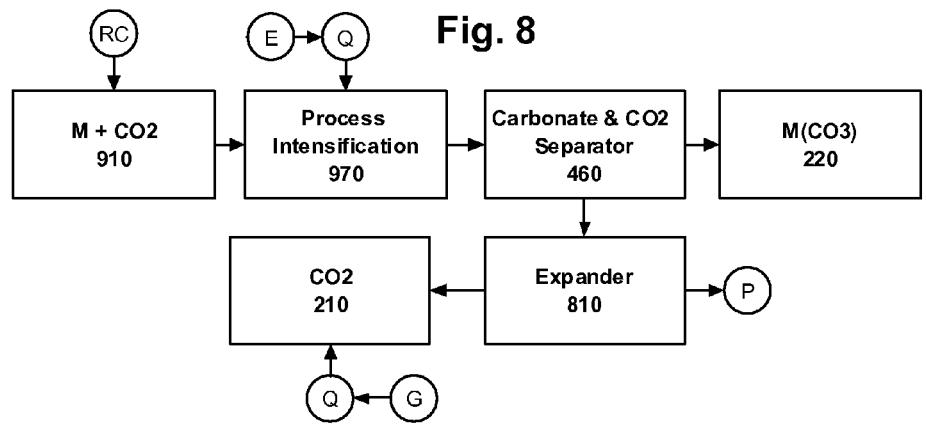
FIG. 8 is a schematic diagram that depicts a carbon dioxide exothermic reaction to increase the enthalpy of a working fluid for a thermodynamic power generating cycle.

Referring to FIG. 8, depicts the direct utilization of thermal energy from an exothermic carbonation reaction to generate power from the stoichiometric excess of $CO_2$. As noted earlier, a $CO_2$ source "RC" can include reaction coproducts as depicted in earlier and subsequent figures. The $CO_2$ is mixed with minerals "M" 910 preferably in a process intensification device 970 as known in the art to accelerate the exothermic chemical reaction. The carbonation products are separated from any unreacted $CO_2$ or stoichiometric excess $CO_2$ by a separator 460 as known in the art such as microfiltration and/or nanofiltration device. The resulting mineral carbonates 220 no longer can damage power generating equipment. The unreacted $CO_2$ or stoichiometric excess $CO_2$, which has a higher enthalpy resulting from the exothermic reaction, is now expanded through an expander 810 to generate power "P". Additional thermal energy can optionally be added to increase the enthalpy by utilizing thermal energy "Q" from an exemplary $CO_2$ absorption process "G" that creates heat of absorption for a subsequent power generating cycle.

Figure 9:
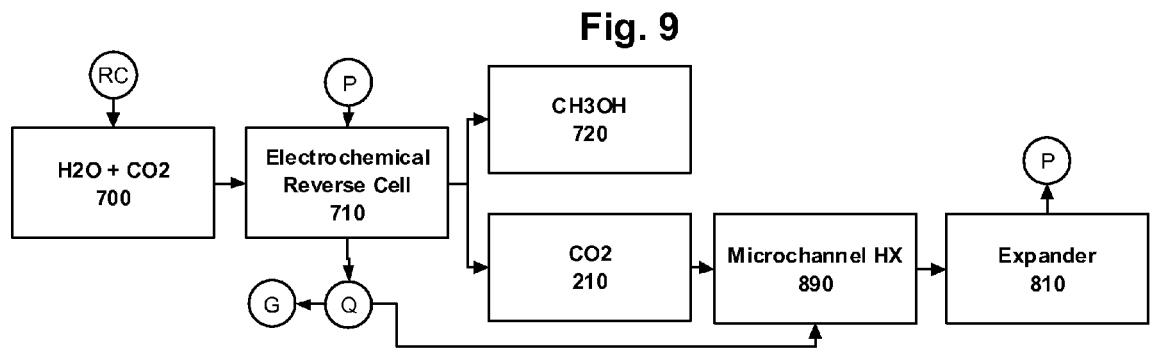
FIG. 9 is a schematic diagram that depicts a reverse fuel cell as an integral component of a thermodynamic power generating cycle.

Referring to FIG. 9, depicts another embodiment that utilizes the stoichiometric excess $CO_2$ post $CO_2$ reaction chemistry mixed with water 700 downstream of the filtration device. The particularly preferred mixture is at pressures greater than the $CO_2$ supercritical pressure. The $CO_2$ and water mixture is subsequently chemically reduced within a reverse fuel cell 710 in order to produce a combustible fuel 720 (e.g., methane). A specifically preferred mixture is comprised of a stoichiometric equivalent of water, and stoichiometric excess of $CO_2$, wherein the stoichiometric excess is at least 5% greater than the amount of $CO_2$ consumed as a reactant within the carbon dioxide reaction and wherein the carbon dioxide reaction is an electrochemical reduction reaction. Without being bound by theory, the electrochemical reduction reaction having a quantum efficiency conversion rate of less than 100% produces thermal energy that is subsequently utilized in situ to increase the enthalpy of the stoichiometric excess of $CO_2$ 210. Yet, another embodiment of CNF is a fuel mixture containing a fuel and carbon dioxide at levels greater than 1,000 ppm that subsequently undergoes an electrochemical or a combustion fuel reaction. The preferred fuel mixture is at a starting pressure greater than the supercritical pressure of carbon dioxide. The particularly preferred fuel mixture also has a stoichiometreic excess of CO2 (i.e., total moles of carbon dioxide is in excess of carbon dioxide consumed in the fuel mixture exothermic reaction). Without being bound by theory, the carbon dioxide is utilized to concurrently increase the transport of the fuel, to increase the fuel reaction rate, and/or to increase fuel efficiency by directly utilizing thermal energy resulting from the fuel reaction to increase the discharge pressure of the reaction products. The reaction products are subsequently expanded from supercritical to subcritical pressure within an expansion devise including a turbine, and positive displacement pump to increase energy production and to provide integral thermal management of the energy production system.

Figure 14:
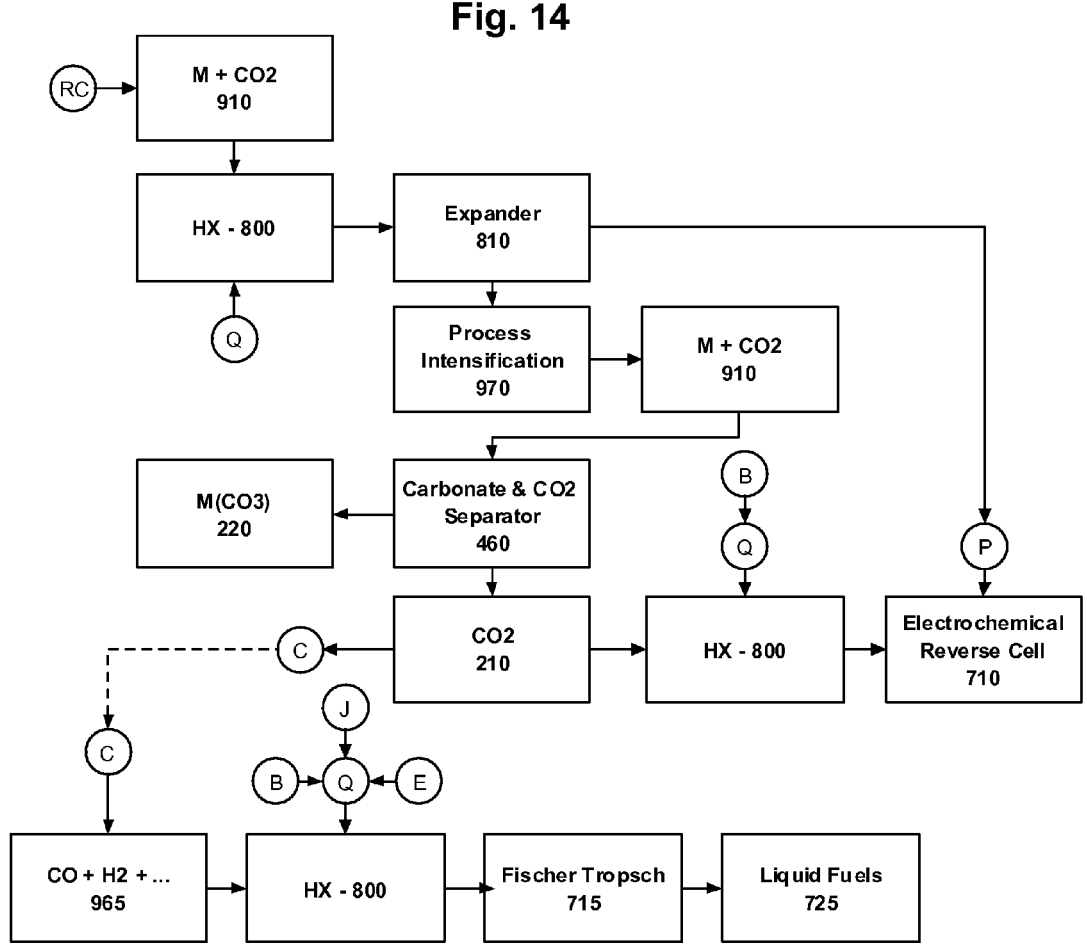
FIG. 14 is a schematic diagram depicting an exothermic carbon dioxide reaction as an integral component in a syngas conversion method.

Referring to FIG. 14, depicts CNF utilizing a stoichiometric excess of CO2 within the thermodynamic power generating cycle working fluid. The particularly preferred stoichiometric excess is at least 5% greater than the amount of CO2 consumed as a reactant within the carbon dioxide reaction. The stochiometric excess has the distinct advantage of enabling the heat generated by the exothermic reaction being immediately infused in situ into the working fluid without the utilization of an additional heat exchanger, and importantly also increasing the surface area of the minerals to subsequently enable further reaction of the CO2 with the newly exposed mineral surface area. It is recognized in the art that CO2 is a superior working fluid for power generation in part attributed to it's relatively low supercritical point and it's high coefficient of thermal expansion. The particularly preferred embodiment of CNF utilizes a working pressure for the in situ CO2 reaction within the thermodynamic power generating cycle at a high-pressure greater than the supercritical pressure of carbon dioxide. A source of CO2 "RC" beyond the stoichiometric requirements for the exothermic carbonation reaction (e.g., minerals+CO2 910) raises the enthalpy of the non-reacted CO2. The enthalpy can be further raised by a second thermal source "Q" prior to expansion through the expander 810 of the non-reacted CO2 yielding additional power "P".

Still referring to FIG. 14, the addition of at least one process intensification mixer 970 including hydrodynamic cavitation devices, spinning disk, or spinning tube in tube enables the remaining non-reacted CO2 to continue reacting 910. The utilization of process intensification mixers accelerates the CO2 reaction rate by further increasing the surface area of the CO2 co-reactants. The preferred mixer is a hydrodynamic cavitation device, without being bound by theory, utilizes the stochiometric excess CO2 to cavitate within the CO2 co-reactant and thus create intense pressures to break up the co-reactants (e.g., minerals). Without being bound by theory, the carbon dioxide (preferably supercritical CO2), and mineral chemically react yielding both a mineral carbonate and thermal energy. When the CO2 is at a stochiometric excess for the mineral reaction the thermal energy expands the excess carbon dioxide further increasing the volume and surface area of the unreacted mineral as a means of subsequently accelerating the rate of reaction between the mineral and the remaining carbon dioxide. The mineral is now mineral carbonate is isolated from the remaining non-reacted CO2 210 by a filtration method 460.

Also referring to FIG. 14, the non-reacted CO2 210 can take at least one of two pathways with the first being the addition of water and thermal energy "Q" from any source including bottom cycle energy "B" from a thermodynamic power generating cycle through heat exchanger 800 into a reverse fuel cell 710 that reduces the CO2 into a liquid fuel; and the second being the direct combination of non-reacted CO2 with additional syngas components 965 including carbon monoxide, hydrogen, and biomass. The second pathway continues by the addition of further thermal energy through heat exchanger 800 to create a syngas and as known in the art further undergoes chemical reactions to yield more desirable reaction products (e.g., Fischer Tropsch 715 to yield liquid fuels 725). Prior to the Fischer Tropsch reaction, thermal energy "Q" from a range of sources "J", "B", or "E" are added to accelerate the reaction via a heat exchanger 800.

Figure 15:
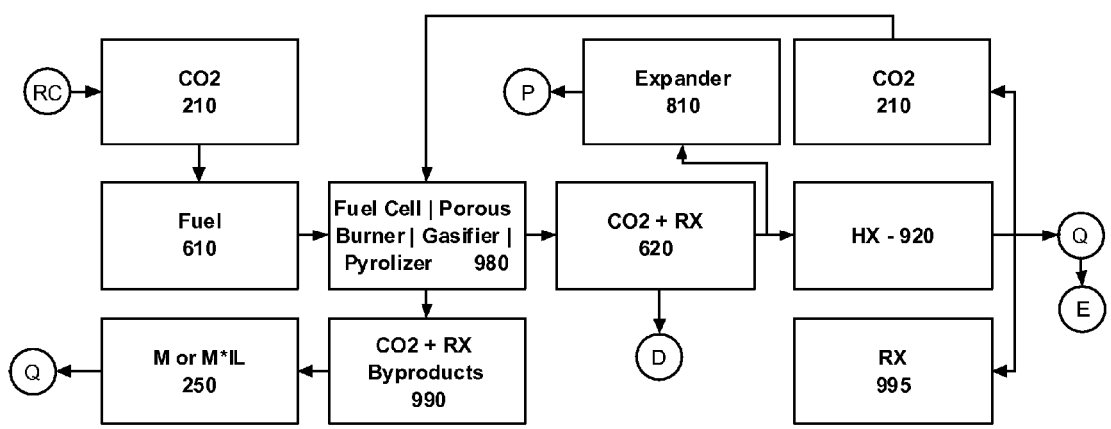
FIG. 15 is a schematic diagram depicting an exothermic carbon dioxide reaction as an integral carrier of a biomass source for direct combustion as a thermal source of a power generating cycle.

Referring to FIG. 15, an exemplary CNF energy production system includes fuel cell, porous burner, pyrolyzer, or gasifier 980. A non-traditional exemplary fuel 610 is selected from the group consisting of carbon, biomass, cellulose, sugar, starch, glycerine, and combinations thereof. These fuels are not readily utilized in traditional combustion processes, without being bound by theory, due to the creation of non-desirable combustion byproducts including char. CNF has the further advantage of utilizing the stoichiometric excess CO2 210 to remove the combustion reaction byproducts 990 that remain within the combustor. Any combustion of a carbon containing fuel yields the further production of CO2 that can be further reacted with CO2 chemistry reaction co-reactants including minerals or minerals w/ ionic liquids 250 to sequester the resulting CO2 in the exothermic carbonation reaction. The thermal energy "Q" created by the exothermic reaction can be transferred for a wide range of purposes as noted in earlier and subsequent figures. The fuel reaction within the reaction device 980 produces additional CO2 and potentially char. The utilization of excess CO2, particularly when the CO2 is at least a pressure greater than the CO2 supercritical pressure, can follow multiple pathways, with the first being energy generation by expanding the excess CO2 through an expander 810 to create power "P"; the second being the further combustion w/ additional fuel via connection point "D"; and the third being the recovery of thermal energy "Q" through a heat exchanger 920 after which the carbon dioxide 210 is separated from the reaction co-products 995.

Figure 11:
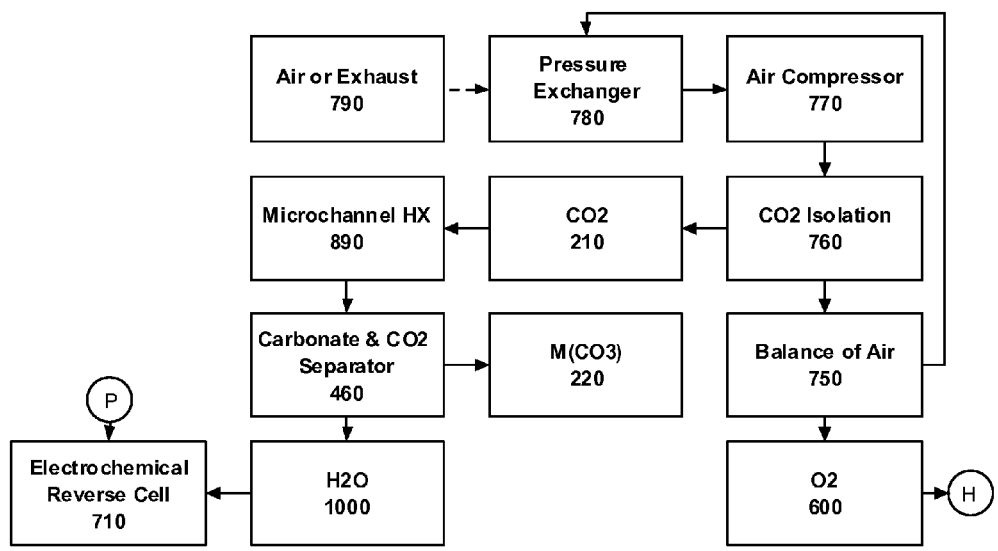
FIG. 11 is a schematic diagram depicting an air compressor for carbon dioxide sequestration as an integral component of a reverse fuel cell.

Referring to FIG. 11, depicts another embodiment of carbon dioxide reaction increasing the energy balance of thermodynamic power generating cycle by utilizing thermal energy to sequester resulting CO2 from the power generating cycles exhaust 790 (or alternatively from ambient air). The use of a pressure exchanger 780 reduces the energy required to compress the incoming air 790 by recovering the non-CO2 components 750 of the incoming air 790. Another embodiment isolates oxygen 600, when the source of air is not combustion exhaust, from the ambient air to increase the CO2 concentration of the combustion air while also reducing the creation of NOx byproducts. A pressure exchanger, as known in the art of reverse osmosis systems, significantly reduces the energy requirements to compress air with the additional thermal energy (resulting from non-adiabatic compression) plus the additional heat of reaction from the mineral carbonation exothermic reaction increase the energy efficiency of the thermodynamic power generating cycle. CNF is CO2 source agnostic for the CO2 utilized in the CO2 reaction chemistry. One preferred source of CO2 is from the combination of a compressed air source 770 in which the compressed air is in fluid communication with a condenser, that can be a microchannel heat exchanger 890, to remove thermal energy and therefore condense CO2 210 followed by the subsequent fluid communication with a CO2 isolation method 460 including nanofiltration, liquid absorption, and solid absorption. The isolated CO2 is then subsequently mixed with minerals to create an exothermic mineral carbonation reaction yielding mineral carbonates 220. The isolation method 460 then isolates the mineral carbonates 220 from the stoichiometric excess of CO2. The stoichiometric excess of CO2 is mixed with water 1000 and then electrochemically reduced via an electrochemical reverse fuel cell 710 utilizing power, which can optionally be from a thermodynamic power generating cycle that is operatively connected to the air compressor CO2 sequestration system. This methodology has the additional benefit of reducing the energy requirements associated with CO2 sequestration by offsetting at least some of the air compressor energy by the incremental additional energy produced from the exothermic CO2 reaction. The further isolation of oxygen from the compressed air source enables the traditional fuel combustion to be more efficient and to yield a higher concentration stream of resulting CO2.

Figure 10:
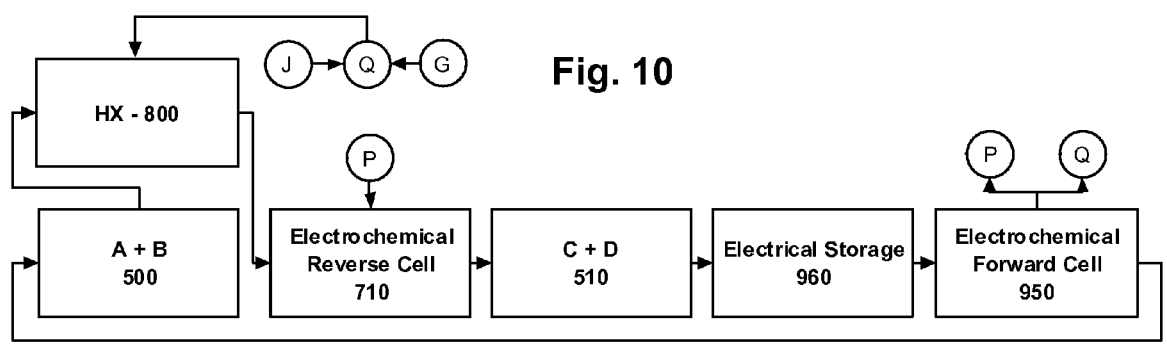
FIG. 10 is a schematic diagram that depicts a reverse fuel cell and a fuel cell in-situ with an endothermic reaction.

Referring to FIG. 10, is depicted another embodiment of the CO2 reaction chemistry process for the utilization of the resulting thermal energy "Q" from this first set of co-reactants "J" (i.e., the exothermic reaction) via a heat exchanger 800 to subsequently drive a second set of co-reactants A+B 500 for a second chemical reaction (i.e., an endothermic reaction) resulting in at least one product C+D 510. A preferred second set of co-reactants are for a reversible electrochemical reaction 710 and wherein the co-reactants preferably include an electrolyte utilized for electrical energy storage 960. The thermal energy from the exothermic carbon dioxide reaction can also be utilized for an endothermic reversible electrochemical reaction. A particularly preferred embodiment has the reversible electrochemical reaction taking place in-situ with an endothermic reaction. A specifically preferred embodiment utilizes the electrolyte of vanadium sulfate. The further inclusion of at least one electron transfer additive increases the quantum efficiency of the reversible electrochemical reaction. Without being bound by theory, the inclusion of at least one electrolyte with the co-reactants yields the dual benefit of increasing quantum efficiency of the electrochemical reaction and direct heating of the electrolyte (from the exothermic reaction which can include a traditional fuel cell (i.e., electrochemical forward cell 950) to accelerate the endothermic reaction 500 in the continuous loop) for the subsequent endothermic direction of a reversible chemical reaction.

The excess CO2 (i.e., not consumed as a reactant within the first carbon dioxide reaction) has a higher enthalpy due to the exothermic heat of reaction to produce incrementally more electricity as a thermodynamic power generating cycle with a stoichiometric excess of CO2. The waste heat from the thermodynamic power generating cycle, which yielded the electricity, can be utilized for a second CO2 endothermic and reduction reaction driven by the electricity produced from the thermodynamic cycle.

Figure 12:
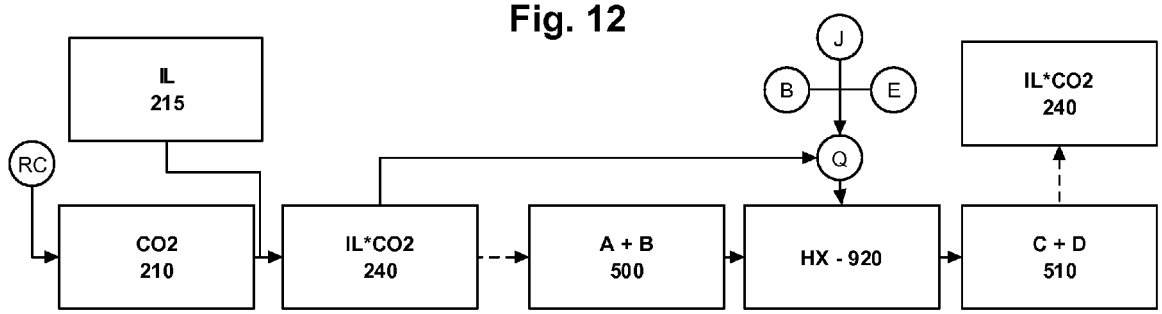
FIG. 12 is a schematic diagram depicting a second embodiment where a carbon dioxide exothermic reaction is integral to an endothermic reaction.

Referring to FIG. 12, depicts an exemplary endothermic reaction in thermal communication with an exothermic carbonation reaction. An exemplary endothermic reaction is salts going into solution wherein the salts specifically have a negative heat of solution. CO2 from virtually any source 210, including sources "RC" indicated from earlier and subsequent figures, is absorbed into an absorbent including ionic liquid 215 as an absorbed ionic liquid and carbon dioxide liquid 240. The process of absorbing the CO2 creates heat of absorption that is in thermal communication with a second reaction of A+B 500 through a heat exchanger 920, or in-situ where the CO2 absorbed into the ionic liquid is in direct contact with the second reaction reactants A+B 500. Additional thermal energy sources "Q" are optionally further added to accelerate the second reaction that yields at least one reaction co-product C+D 510. When the absorbed CO2 into ionic liquid IL*CO2 240 is in-situ, the IL*CO2 240 is subsequently isolated from the second reaction co-products 510.

Figure 13:
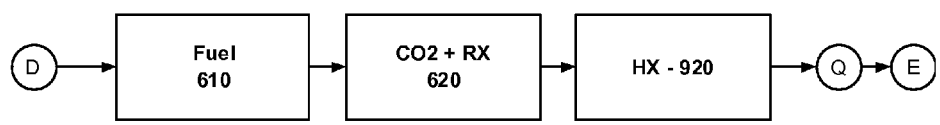
FIG. 13 is a schematic diagram depicting an exothermic carbon dioxide reaction into a fuel utilization method for direct power generation.

Referring to FIG. 13, an exemplary endothermic reaction is a catalytic biomass to biofuel synthesis reaction creating an excess CO2, which can be sourced from a variety of CO2 streams including "D" (within FIG. 15 as a fuel reaction product) is further combined with a fuel 610 (e.g., biomass such as cellulose, glycerin, etc.) to reduce the effective viscosity of the fuel prior to the reaction. The reaction produces additional CO2 plus the prior stoichiometric excess of CO2 and reaction products CO2+RX 620 and thermal energy "Q" that is removed by a heat exchanger 920 and transferred to additional processes as earlier or subsequently referred to by connector "E".

What is claimed is:

1. An energy production system operable to reduce fuel requirement of a thermodynamic power generating cycle comprising: a) a thermodynamic power generating cycle having a working fluid and producing waste heat, wherein the thermodynamic power generating cycle consumes fuel to generate generated energy; and b) a carbon dioxide reaction having carbon dioxide and a carbon dioxide co-reactant, wherein the carbon dioxide reaction is an exothermic reaction producing a thermal source within the thermodynamic power generating cycle.

2. The energy production system according to claim 1 wherein the carbon dioxide reaction concurrently increases energy efficiency of the thermodynamic power generating cycle and sequesters carbon dioxide, and wherein the carbon dioxide generated from the thermodynamic power generating cycle with the carbon dioxide reaction is at least 5% less carbon dioxide per unit of generated energy as compared to the thermodynamic power generating cycle without the carbon dioxide reaction.

3. The energy production system according to claim 1 wherein the carbon dioxide reaction is an exothermic reaction.

4. The energy production system according to claim 3 wherein the carbon dioxide reaction consists of reactions creating carbonates and polycarbonates.

5. The energy production system according to claim 1 is further comprised of an endothermic reaction, wherein the thermodynamic power generating cycle creates bottom cycle waste heat, and wherein the waste heat is utilized in the endothermic reaction including endothermic reactions in a biomass to biofuel synthesis or salts having a negative heat of solution.

6. The energy production system according to claim 1 wherein the carbon dioxide reaction consists of carbon dioxide and a co-reactant, wherein the co-reactant is solubilized prior to the carbon dioxide reaction.

7. The energy production system according to claim 1 wherein the carbon dioxide is an absorbate within an absorbent during the carbon dioxide reaction.

8. The energy production system according to claim 1 wherein the absorbate solubilizes the co-reactant of the carbon dioxide reaction.

9. The energy production system according to claim 1 wherein the absorbent is operable to increase surface area and reaction rate and wherein the absorbent is selected from the group consisting of ionic liquids, poly(ionic liquids).

10. The energy production system according to claim 1 wherein the carbon dioxide is a supercritical fluid.

11. The energy production system according to claim 1 operable to reduce parasitic losses from the generated energy wherein the generated energy is from a first thermodynamic power generating cycle further comprising an absorption heat pump, wherein the carbon dioxide reaction increases the enthalpy within the first thermodynamic power generating cycle, wherein waste heat from the first thermodynamic power generating cycle is at least in part a thermal source for the absorption heat pump, and wherein the absorption heat pump produces cooling to condense carbon dioxide.

12. The energy production system according to claim 1 wherein the thermodynamic power generating cycle is comprised of at least one thermal reaction selected from the group consisting of either a carbon dioxide reaction prior to a first thermal reaction wherein the carbon dioxide reaction has a starting temperature of less than 400 Fahrenheit or a first thermal reaction prior to the carbon dioxide reaction, wherein the first thermal reaction is at a starting temperature, and wherein the starting temperature is at a temperature selected from: a) less than 400 Fahrenheit; b) less than 250 Fahrenheit; c) less than 100 Fahrenheit; or d) less than ambient temperature.

13. The energy production system according to claim 1 operable to increase the enthalpy of the thermodynamic power generating cycle further comprising a condensing device having a working fluid with a discharge temperature, wherein the carbon dioxide reaction has a starting temperature of approximately the discharge temperature, and wherein the carbon dioxide reaction is in fluid communication with the working fluid.

14. The energy production system according to claim 1 wherein the thermodynamic power generating cycle working fluid consists of a stoichiometric excess of carbon dioxide and wherein the stoichiometric excess is at least 5% greater than an amount of carbon dioxide consumed as a reactant within the carbon dioxide reaction.

15. The energy production system according to claim 14 wherein the thermodynamic power generating cycle has a high-pressure greater than the supercritical pressure of carbon dioxide.

16. The energy production system according to claim 1 further comprising expansion device, wherein the expansion device is operable to handle at least 5% on a volume basis solid or liquid reaction products resulting from the carbon dioxide reaction.

17. The energy production system according to claim 1 further comprising a filtration device upstream of an expansion device, wherein the reaction products have a molecular weight greater than 200 grams per mole or agglomerates less than 2 microns in diameter, wherein the filtration device is operable to remove reaction products from the carbon dioxide reaction, and wherein the expansion device produces generated energy.

18. The energy production system according to claim 1 further comprising at least one process intensification mixer including hydrodynamic cavitation devices, spinning disk, or spinning tube in tube, wherein the intensification mixer increases the carbon dioxide reaction producing carbon dioxide reaction products.

19. The energy production system according to claim 1 further comprising at least one microchannel device, wherein the microchannel device has channels less than 10 microns and wherein the microchannel device is upstream of carbon dioxide and the carbon dioxide co-reactant mixing.

20. The energy production system according to claim 18 wherein the carbon dioxide reaction products have a particle size diameter of less than 1 micron.

21. The energy production system according to claim 17 wherein the thermodynamic power generating cycle working fluid consists of a stoichiometric excess of carbon dioxide, wherein the stoichiometric excess is at least 5% greater than the amount of carbon dioxide consumed as a reactant within the carbon dioxide reaction, wherein the working fluid is mixed with water downstream of the filtration device, and wherein the working fluid downstream of the filtration device is chemically reduced within a reverse fuel cell.

22. The energy production system according to claim 1 operable to produce carbon dioxide for the carbon dioxide reaction further comprising: a) a compressed air source, wherein the compressed air is a source of carbon dioxide for the carbon dioxide reaction; b) a condenser, wherein the condenser condenses the carbon dioxide from the compressed air; and c) a carbon dioxide isolation method including nanofiltration, liquid absorption, and solid absorption, wherein the carbon dioxide isolation method isolates the carbon dioxide for the carbon dioxide reaction.

23. The energy production system according to claim 22 operable to enhance combustion of the fuel further comprising a method to isolate oxygen, wherein the oxygen is from the compressed air.

24. The energy production system according to claim 1 further comprising methods to increase surface area, wherein the carbon dioxide and co-reactant are further processed by process methods including hydrodynamic cavitation.

25. The energy production system according to claim 1 wherein the carbon dioxide reaction consumes the carbon dioxide and the carbon dioxide co-reactant further comprising a second set of co-reactants for a second chemical reaction, wherein the second chemical reaction is an endothermic reaction that consumes the waste heat of the thermodynamic power generating cycle.

26. The energy production system according to claim 25 operable to consume the waste heat from the exothermic carbon dioxide reaction further comprising a reversible electrochemical reaction, wherein waste heat is utilized in the reversible electrochemical reaction, wherein the second set of co-reactants are consumed in the reversible electrochemical reaction and wherein the co-reactants include an electrolyte operable to produce electrical energy and stored in an electrical energy storage device.

27. The energy production system according to claim 25 further comprising a second endothermic reaction, wherein the endothermic reaction is in-situ with the reversible electrochemical reaction.

28. The energy production system according to claim 26 wherein the electrolyte is vanadium sulfate.

29. An energy production system operable as an electrochemical reduction reaction comprising a carbon dioxide reaction having a working fluid, carbon dioxide, and carbon dioxide co-reactant, wherein the working fluid is comprised of a stoichiometric equivalent of water and stoichiometric excess of carbon dioxide and wherein the stoichiometric excess is at least 5% greater than the amount of carbon dioxide consumed as a reactant within the carbon dioxide reaction and wherein the carbon dioxide reaction is the electrochemical reduction reaction.

30. The energy production system according to claim 29 operable to increase the enthalpy of the stoichiometric excess of carbon dioxide wherein the electrochemical reduction reaction has a quantum efficiency conversion rate of less than 100%, wherein the electrochemical reduction reaction results in the creation of thermal energy, and wherein the thermal energy increases the enthalpy of the stoichiometric excess of carbon dioxide.

31. The energy production system according to claim 29 operable to increase generated power and reduce fuel consumption further comprising a thermodynamic power generating cycle, wherein the carbon dioxide reaction results in the creation of thermal energy utilized within the thermodynamic power generating cycle to produce additional generated energy.

32. The energy production system according to claim 29 wherein the working fluid is further comprising at least one of an electrolyte and electron transfer additive.

33. The energy production system according to claim 32 further comprising of a reversible chemical reaction, wherein the electrolyte is a co-reactant in the carbon dioxide reaction and wherein the electrolyte is utilized within the endothermic direction of the reversible chemical reaction.

34. An energy production system operable to reduce external thermal energy comprising: a) a carbon dioxide absorption process having carbon dioxide and a carbon dioxide absorbent, wherein the carbon dioxide absorption process produces heat of absorption; and b) an endothermic chemical reaction having co-reactants, wherein the heat of absorption is at least a partial source of thermal energy to the endothermic chemical reaction.

35. The energy production system according to claim 34 further comprised of at least one additive of an electrolyte and electron transfer additive, wherein the at least one additive is combined with the co-reactants.

36. An energy production system operable to increase reaction rate comprising: a) a carbon dioxide, wherein the carbon dioxide is a supercritical fluid having a pressure greater than the supercritical pressure; b) at least one mineral, wherein the mineral chemically reacts with the carbon dioxide; and c) a thermal energy source, wherein the thermal source expands the volume of carbon dioxide and the volume increases the mineral surface area as a means of accelerating the reaction rate between the mineral and the carbon dioxide.

37. The energy production system according to claim 36 operable to increase the reaction rate further comprised of a method to achieve hydrodynamic cavitation, wherein the reaction rate is further accelerated by the hydrodynamic cavitation.

38. An energy production system operable to produce electricity and waste heat comprising: a) a first carbon dioxide reaction, wherein the first carbon dioxide reaction consists of carbon dioxide and carbon dioxide co-reactants; b) a thermodynamic power generating cycle having a working fluid of a stoichiometric excess of carbon dioxide, wherein the stoichiometric excess is at least 5% greater than the amount of carbon dioxide consumed in the first carbon dioxide reaction and wherein the thermodynamic power generating cycle produces electricity and waste heat; and c) a second carbon dioxide reaction, wherein the electricity generated from the thermodynamic power generating cycle is utilized to reduce the stoichiometric excess of carbon dioxide into reduced carbon dioxide in the second carbon dioxide reaction.

39. The energy production system according to claim 38 wherein the waste heat is utilized to accelerate the second carbon dioxide reaction.

40. The energy production system according to claim 38 operable to produce syngas further comprised of hydrogen, wherein the reduced carbon dioxide is further combined with the hydrogen to create syngas.

41. The energy production system according to claim 38 wherein the stoichiometric excess is at least 5% greater than the sum of carbon dioxide consumed as a reactant in the first carbon dioxide reaction and the second carbon dioxide reaction.

42. An energy production system operable to increase energy efficiency comprising a fuel mixture and a fuel reaction, wherein the fuel mixture contains carbon dioxide at levels greater than 1,000 parts per million and fuel, and wherein the fuel reaction is either an electrochemical or a combustion reaction.

43. The energy production system according to claim 42 wherein the fuel mixture is at a pressure greater than the supercritical pressure of carbon dioxide.

44. The energy production system according to claim 42 wherein the total moles of carbon dioxide is in excess of carbon dioxide consumed in the fuel mixture exothermic reaction.

45. The energy production system according to claim 42 wherein the carbon dioxide is operable to increase transport of the fuel in the fuel reaction and to increase the fuel reaction rate.

46. The energy production system according to claim 42 wherein the fuel reaction produces waste heat and fuel reaction products, and wherein the carbon dioxide is operable to increase the fuel reaction fuel efficiency by directly utilizing waste heat from the fuel reaction to increase discharge pressure of the fuel reaction products.

47. The energy production system according to claim 46 further comprising an expansion device, wherein the fuel reaction products are expanded from supercritical to subcritical pressure within the expansion device, wherein the expansion device includes a turbine, and positive displacement pump, wherein the expansion device increases the energy produced by the energy production system, and wherein the expansion device provides integral thermal management of the energy production system.

48. The energy production system according to claim 42, wherein the energy production system includes a fuel cell, a porous burner, a pyrolyzer, or a gasifier.

49. The energy production system according to claim 42 wherein the fuel is at least one of carbon, biomass, cellulose, sugar, starch, glycerine, and combinations thereof.

50. The energy production system according to claim 42 wherein the carbon dioxide is further utilized to remove reaction byproducts of the fuel reaction.

51. The energy production system according to claim 42 operable to sequester carbon dioxide further comprising an exothermic reaction, wherein the fuel reaction byproducts are further reacted to sequester carbon dioxide in the exothermic reaction, wherein the exothermic reaction produces waste heat and wherein the exothermic reaction waste heat is further utilized to increase energy produced.

* * * * *